(12) United States Patent
Lansiaux et al.

(10) Patent No.: US 9,688,377 B2
(45) Date of Patent: Jun. 27, 2017

(54) PART OF A FUSELAGE OF AN AIRCRAFT AND AIRCRAFT COMPRISING A KEEL BEAM AND AN AFT LOWER SHELL

(71) Applicant: Airbus Operations (S.A.S.), Toulouse (FR)

(72) Inventors: Rémi Lansiaux, Toulouse (FR); Francesco Fiore, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 14/601,936

(22) Filed: Jan. 21, 2015

(65) Prior Publication Data

US 2015/0225062 A1     Aug. 13, 2015

(30) Foreign Application Priority Data

Jan. 22, 2014   (FR) ..................... 14 50507

(51) Int. Cl.
*B64C 1/06*     (2006.01)
*B64C 1/12*     (2006.01)
*B64C 1/00*     (2006.01)

(52) U.S. Cl.
CPC ............ *B64C 1/061* (2013.01); *B64C 1/065* (2013.01); *B64C 1/12* (2013.01); *B64C 2001/0072* (2013.01); *Y02T 50/433* (2013.01)

(58) Field of Classification Search
CPC  B64C 1/061; B64C 1/065; B64C 1/12; B64C 2001/0072; Y02T 50/433
See application file for complete search history.

(56) References Cited

U.S. PATENT DOCUMENTS

| | | | | |
|---|---|---|---|---|
| 5,324,563 | A | * 6/1994 | Rogers et al. | ......... B29C 70/20 244/117 R |
| 5,619,903 | A | * 4/1997 | Rogers et al. | ........... D04C 1/06 87/5 |
| 7,810,756 | B2 | 10/2010 | Alby et al. | |
| 8,333,858 | B2 | * 12/2012 | Rubin et al. | ......... B29C 70/504 156/200 |
| 2013/0034705 | A1 | * 2/2013 | Matsen et al. | ............ B32B 7/12 428/189 |
| 2013/0209746 | A1 | 8/2013 | Reighley et al. | |
| 2014/0042271 | A1 | * 2/2014 | Paci et al. | ............... B29C 70/30 244/118.1 |
| 2015/0203185 | A1 | * 7/2015 | Rosman et al. | .......... B64C 1/12 244/131 |

FOREIGN PATENT DOCUMENTS

EP     2 532 580     12/2012
FR     2 901 240     11/2007

OTHER PUBLICATIONS

Preliminary Search Report for French Application No. 1450507 dated Oct. 9, 2014.

* cited by examiner

*Primary Examiner* — Valentina Xavier
(74) *Attorney, Agent, or Firm* — Jenkins, Wilson, Taylor & Hunt, P.A.

(57) ABSTRACT

The subject matter disclosed herein relates to a part of a fuselage of an aircraft having a longitudinal axis, the part including a keel beam and a lower rear shell, each being made from composite materials of the type comprising fibers and of which a part of the fibers extends continuously between the keel beam and the lower rear shell.

5 Claims, 1 Drawing Sheet

SINGLE PLATE

PART OF A FUSELAGE OF AN AIRCRAFT AND AIRCRAFT COMPRISING A KEEL BEAM AND AN AFT LOWER SHELL

CROSS-REFERENCE TO RELATED APPLICATION

This application claims the benefit of the French patent application No. 14 50507 filed on Jan. 22, 2014, the entire disclosure of which is incorporated herein by reference.

BACKGROUND

The present disclosure relates to a part of a fuselage of an aircraft, and to an aircraft comprising such a part.

FIG. 1 shows a part 100 of a fuselage of an aircraft having a longitudinal axis 10. The part 100 comprises a keel beam 106 and a lower rear shell 108.

When the keel beam 106 and the lower rear shell 108 are made from composite materials of the type comprising fibers, the part 100 also comprises, between the keel beam 106 and the lower rear shell 108, a junction region 110.

The majority of the fibers of the keel beam 106 are oriented parallel to the longitudinal axis 10 and are thus to be oriented at 0° with respect to this longitudinal axis 10.

A part or portion of the fibers of the lower rear shell 108 is oriented at +/−45° with respect to the longitudinal axis 10 and another part or portion of the fibers of the lower rear shell 108 is oriented at 90° with respect to the longitudinal axis 10.

The junction region 110 is then oversized in order to allow the fibers of the keel beam 106, the fibers of the lower rear shell 108 and the fibers forming intermediate plies to be superposed.

SUMMARY

One object of the present disclosure is to propose a part of a fuselage of an aircraft comprising both a keel beam 106 and a lower rear shell 108 which does not have the drawbacks of the prior art and which in particular makes it possible to reduce the weight of the part.

To that end, what is proposed is a part of a fuselage of an aircraft having a longitudinal axis, the part comprising a keel beam and a lower rear shell, each being made from composite materials of the type comprising fibers and of which a part of the fibers extends continuously between the keel beam and the lower rear shell.

This arrangement makes it possible to reduce the number of fibers put in place in the junction region and therefore the weight of this junction region, while improving the structural behavior of the whole.

BRIEF DESCRIPTION OF THE DRAWINGS

The abovementioned features of the subject matter disclosed herein, as well as others, will become clearer upon reading the following description of an exemplary embodiment, the description being made with reference to the appended drawings, in which.

DETAILED DESCRIPTION

Figure 1:
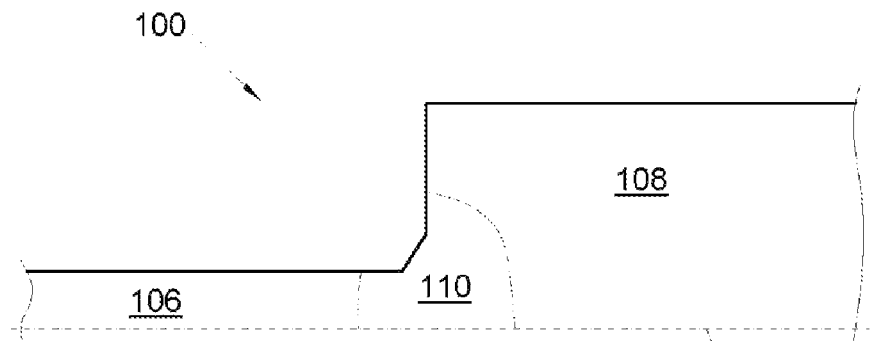
FIG. 1 shows a part of an aircraft fuselage according to the prior art.
Figure 2:
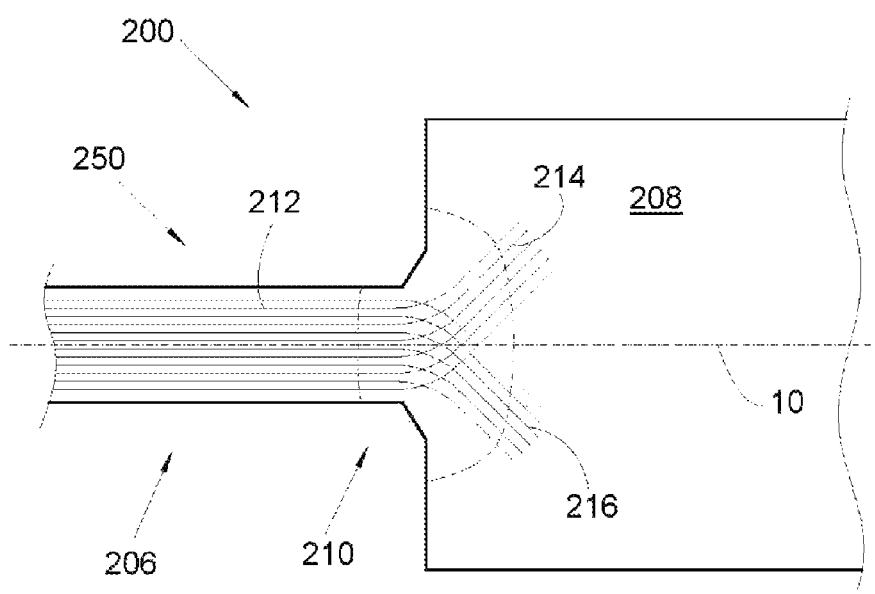
FIG. 2 shows the spatial distribution of the fibers of a part of a fuselage of an aircraft according to the subject matter disclosed herein.

FIG. 2 shows a part 200 of a fuselage of an aircraft having a longitudinal axis 10. The part 200 comprises a keel beam 206 and a lower rear shell 208 which are joined at a junction region 210.

The keel beam 206 and the lower rear shell 208 are made from composite materials of the type comprising fibers 250.

A part of the fibers 250 extends continuously along the keel beam 206, the junction region 210 and the lower rear shell 208. There is thus structural continuity between the keel beam 206 and the lower rear shell 208.

This continuity makes it possible to limit the quantity of fibers in the junction region 210 and thus to lighten this junction region 210.

In particular, each fiber 250 which extends between the keel beam 206 and the lower rear shell 208 comprises an upstream part 212 forming the keel beam 206 and a downstream part 214, 216 forming the lower rear shell 208.

The upstream parts 212 are oriented at 0° with respect to the longitudinal axis 10.

The downstream parts 214, 216 are oriented at an angle other than 0° with respect to the longitudinal axis 10.

In the embodiment of FIG. 2, the downstream parts 214 are oriented at −45° with respect to the longitudinal axis 10, and the downstream parts 216 are oriented at +45° with respect to the longitudinal axis 10.

The junction region 210 thus serves as an orientation transition region for the fibers 250 having upstream parts 212 and downstream parts 214, 216 of different orientations.

This variation in orientation also makes it possible to optimize the orientation of the plies to obtain a better distribution of loads between the keel beam 206 and the lower rear shell 208. In particular, the fibers 250 are thus oriented along the principal load directions, which improves the structural behavior of the whole.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A part of a fuselage of an aircraft having a longitudinal axis, the part comprising a keel beam and a lower rear shell, wherein the keel beam and the lower rear shell each comprise composite materials comprising fibers, wherein a portion of the fibers extend continuously between the keel beam and the lower rear shell, and wherein the portion of the fibers comprise upstream parts, which form at least a part of the keel beam and are oriented parallel to the longitudinal axis, and downstream parts, which form at least a part of the lower rear shell and are oriented at an angle other than parallel to the longitudinal axis.

2. The part according to claim 1, wherein a portion of the downstream parts are oriented at −45° with respect to the longitudinal axis, and another portion of the downstream parts are oriented at +45° with respect to the longitudinal axis.

3. An aircraft comprising a fuselage with a keel beam and a lower rear shell forming at least one part according to claim 1.

4. The part according to claim 1, comprising a junction region disposed between the keel beam and the lower rear shell.

5. The part according to claim 4, wherein the junction region comprises an orientation transition region for the portion of the fibers.

\* \* \* \* \*